United States Patent [19]

Jwuc

[11] 4,433,834
[45] Feb. 28, 1984

[54] COMPOSITE CUSHION PAD

[75] Inventor: Karl J. Jwuc, Tallmadge, Ohio

[73] Assignee: Midland-Ross Corporation, Cleveland, Ohio

[21] Appl. No.: 330,617

[22] Filed: Dec. 14, 1981

Related U.S. Application Data

[63] Continuation of Ser. No. 185,714, Sep. 10, 1980, abandoned, which is a continuation of Ser. No. 121,332, Feb. 13, 1980, abandoned, which is a continuation of Ser. No. 963,381, Nov. 24, 1978, abandoned.

[51] Int. Cl.³ .............................................. F16F 1/40
[52] U.S. Cl. .................................. 267/141.1; 267/153
[58] Field of Search ........ 267/63 R, 140, 140.1–140.5, 267/141, 141.1–141.7, 152, 153

[56] References Cited

U.S. PATENT DOCUMENTS

| | | | |
|---|---|---|---|
| 3,086,765 | 4/1963 | Zanow | 267/63 R |
| 3,434,708 | 3/1969 | Hawk | 267/153 X |
| 3,796,167 | 3/1974 | Van Moss | 267/63 R X |
| 3,997,151 | 12/1976 | Leingang | 267/63 R X |

*Primary Examiner*—Duane A. Reger

*Attorney, Agent, or Firm*—Harlan E. Hummer

[57] ABSTRACT

A composite cushion pad for railroad cars or off-the-road vehicles is disclosed. The composite cushion pad can be circular or rectangular, depending on its use. The circular composite cushion pad is composed of a rigid circular plate having a centrally disposed opening which is surrounded by two juxtaposed, resilient elastomeric annular cushions that form a composite cushion which is bonded to at least one side of the plate. The two annular cushions each have a generally frusto-conically shaped cross-section and are dissimilarly sized so that the composite cushion has a pair of opposing stepped sidewalls. The rectangular composite cushion pad is composed of a rigid rectangular plate. A first, resilient elastomeric cushion with a generally frusto-conically shaped cross-section, is bonded to the rectangular plate and at least one smaller sized resilient elastomeric cushion, also with a generally frusto-conically shaped cross-section, is disposed atop the first cushion to again form a composite cushion which extends from at least one side of the plate and which also has a pair of opposing stepped sidewalls.

3 Claims, 9 Drawing Figures

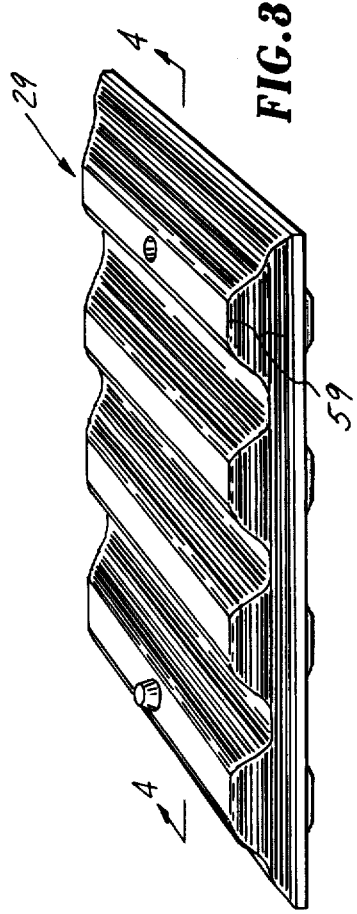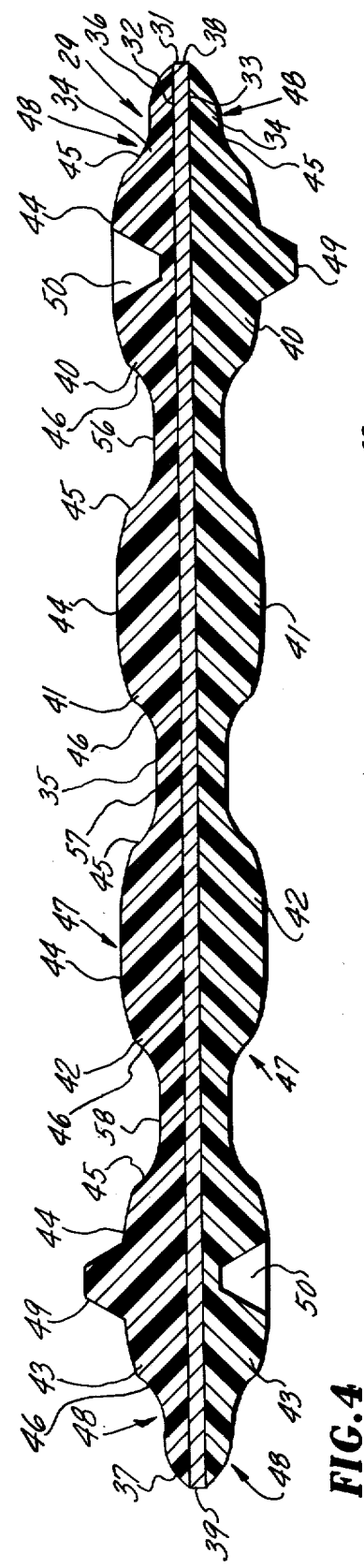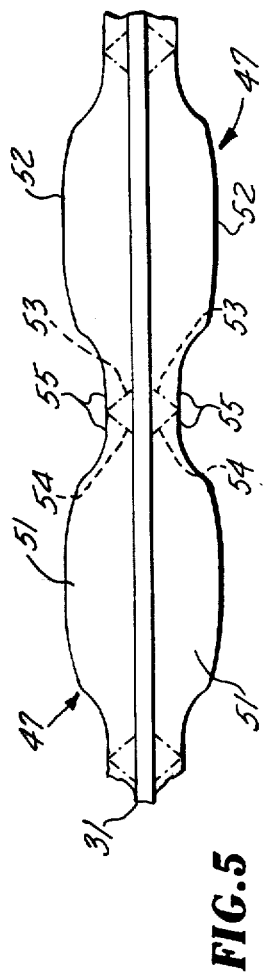

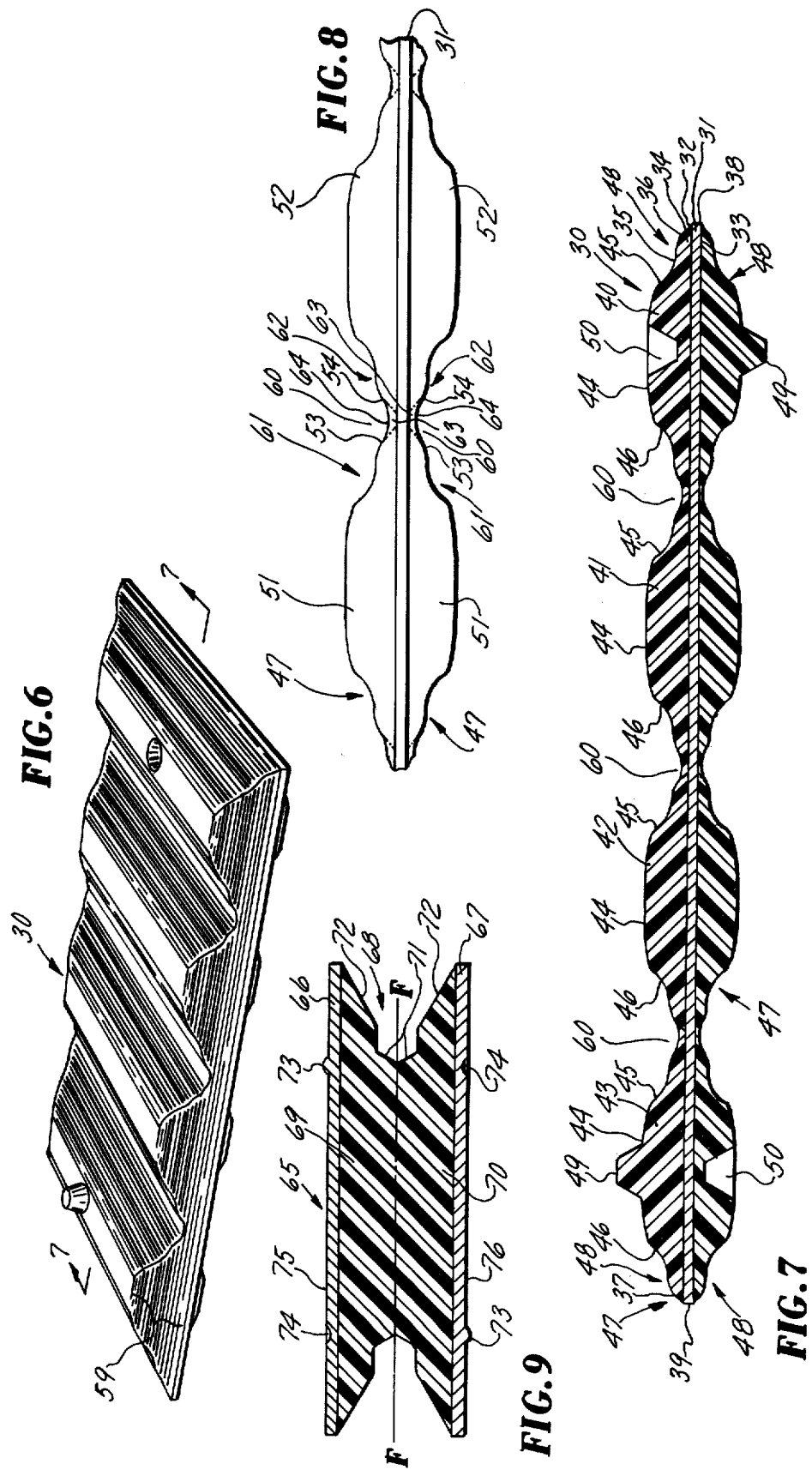

COMPOSITE CUSHION PAD

This is a continuation of application Ser. No. 185,714, filed Sept. 10, 1980, now abandoned, which is a continuation of application Ser. No. 121,332, filed Feb. 13, 1980, now abandoned, which is a continuation of application Ser. No. 963,381, filed Nov. 24, 1978, now abandoned.

BACKGROUND OF THE INVENTION

The invention is generally suited for any application involving cushion pads, and, more particularly, for use in connection with off-the-road vehicles, e.g. large trucks, wherein it is desirable to provide a soft cushioning effect in the suspension systems of the vehicles, when they are operated empty and without loads, and a much firmer or harsher cushioning effect, when the vehicles are operated fully loaded.

U.S. Pat. Nos. 3,086,765 and 3,537,696 are typical of the many patents relating to circular cushion pads which are generally composed of a single rubber ring which has a generally frusto-conically shaped cross-section and is bonded to one or both sides of an annular rigid plate. U.S. Pat. No. 4,025,063 is typical of the many patents relating to rectangular cushion pads which are essentially composed of a plurality of parallel rubber cushions, each of which has a generally frusto-conically shaped cross-section. The invention is directed to an improved composite cushion pad having a different configuration which initially provides soft ride characteristics with improved resistance to compression when placed under a load.

Briefly stated, the invention is in a composite cushion pad which has a rigid plate with opposing planar surfaces. A first, bottom cushion of resilient elastomeric material is bonded to at least one of the opposing surfaces of the plate and extends therefrom. The bottom cushion has a generally frusto-conical cross-section defined by a pair of opposing sidewalls which converge towards each other in a direction away from the plate. At least one other resilient elastomeric top cushion is disposed in superimposed relation atop the bottom cushion and, likewise, has a generally frusto-conical cross-section defined by a pair of opposing sidewalls which also converge towards each other in a direction away from the plate. The converging sidewalls of the top cushion or cushions, adjacent the converging sidewalls of the bottom cushion, are laterally offset from the converging sidewalls of the bottom cushion inwardly towards each other to form a composite cushion of differently sized cushions with a pair of opposing stepped sidewalls.

DESCRIPTION OF THE DRAWING

The following description of the invention will be better understood by having reference to the accompanying drawing, wherein:

FIG. 3 is a perspective view of a rectangular composite cushion pad made in accordance with the invention;

FIG. 4 is a section of the rectangular pad viewed from the line 4—4 of FIG. 3;

FIG. 5 is a side view of a portion of the rectangular pad, illustrating the construction of the pad;

FIG. 6 is a perspective view of another embodiment of a rectangular composite pad;

FIG. 7 is a section of the rectangular pad of FIG. 6, viewed from the line 7—7 thereof;

FIG. 8 is a side view of a portion of the rectangular pad of FIG. 6 illustrating the construction of the pad; and FIG. 9 is a cross-section of another embodiment of the invention, and illustrations how two composite pads with a single top cushion can be adapted to produce a different cushion pad with a twin-size composite cushion pad.

DESCRIPTION OF THE INVENTION

Figure 1:
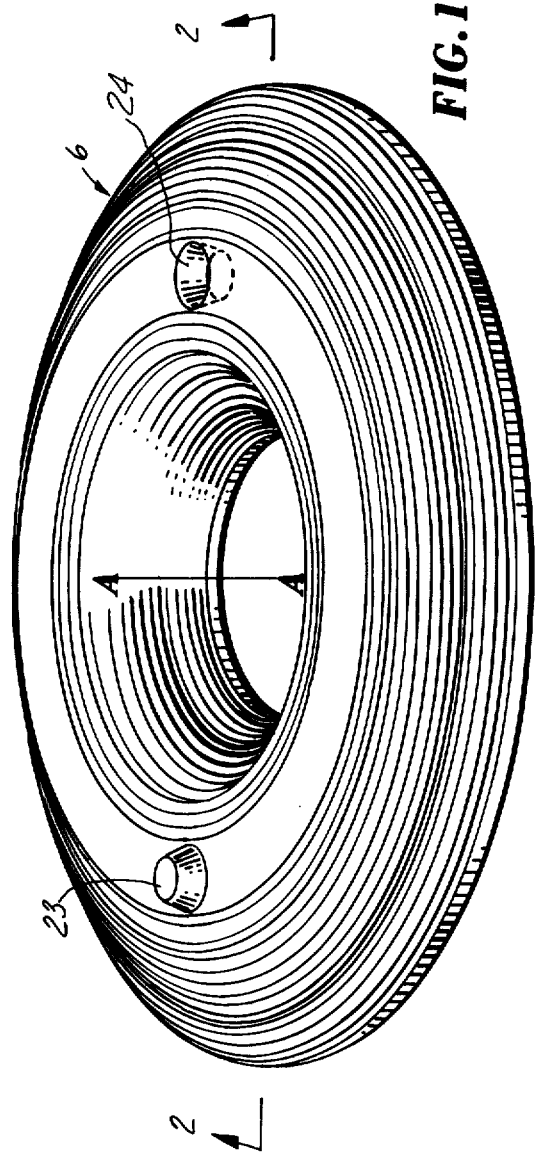
FIG. 1 is a perspective view of a circular composite cushion pad made in accordance with the invention.
Figure 2:
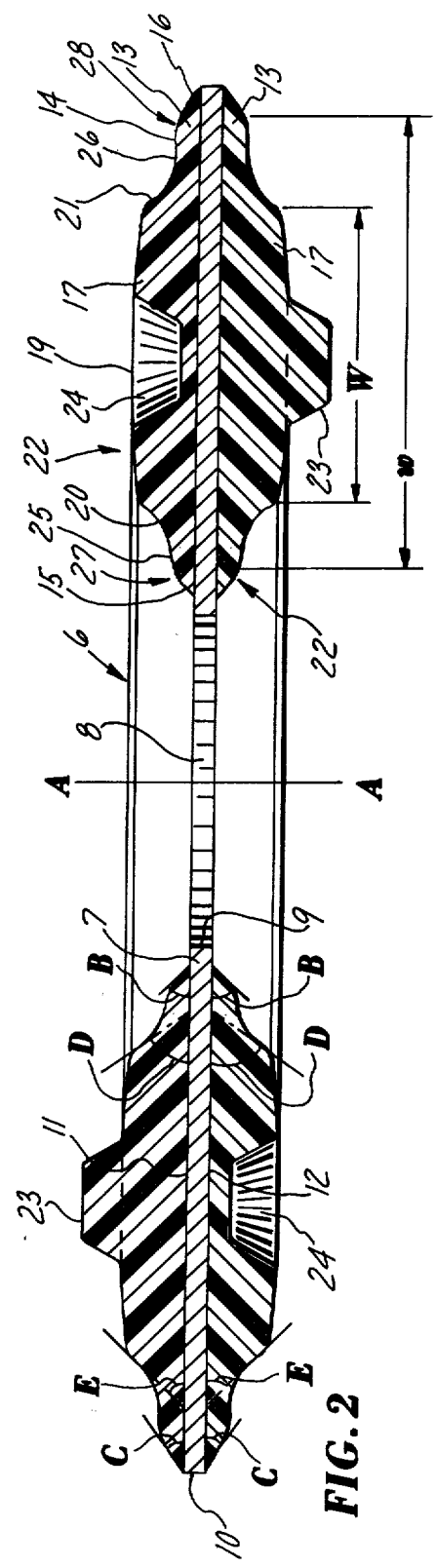
FIG. 2 is a section of the pad viewed from the line 2—2 of FIG. 1.

With reference to FIGS. 1 and 2, there is shown a composite cushion pad 6 which is designed for use in large off-the-road vehicles. The composite cushion pad 6 comprises a flat, rigid circular plate 7 having a centrally disposed opening 8 with a center axis A—A. The annular plate 7 is composed of any suitable material, e.g. steel, and is defined between a pair of inner and outer circular marginal edges 9,10, relative to the center axis and a pair of opposing annular planar surfaces 11,12.

A first, inner annular cushion 13 is conventionally bonded to each of the pair of planar surfaces 11,12 of the metal plate 7 and extends therefrom. The inner or bottom cushions 13, closest the metal plate 7, surround the opening 8, and, preferably cover the planar surfaces 11,12 of the metal plate 7 and are concentrically disposed about the center axis A—A of the opening 8. Each of the bottom cushions 13 is composed of any suitable resilient elastomeric material, such as rubber, and has a generally frusto-conical cross-section, defined by (i) an outer surface 14 which is generally parallel to the planar surfaces 11,12 or plane of the metal plate 7, and (ii) a pair of inner and outer sloping sidewalls 15,16 which are angularly disposed to the plane of the metal plate 7 and converge towards each other in a direction away from the metal plate 7. The sloping annular sidewalls 15,16 of the bottom cushions 13 can be flat, concave, or convex intermediate their opposing circular marginal edges depending on the cushioning effect desired.

A second, outer annular cushion 17 is superimposed on the outer surface 14 of each bottom cushion 13 and extends therefrom in a direction away from the metal plate 7. The outer or top cushions 17, farthest from the metal plate 7, like the bottom cushions 13, each have a generally frusto-conical cross-section defined by (i) an outer surface 19 which is at least flat and preferably convexly curved in relation to the plane of the metal plate 7, and (ii) a pair of inner and outer sloping sidewalls 20,21 which are angularly disposed to the plane of the metal plate 7 and generally converge towards each other in a direction away from the metal plate 7. The sloping annular sidewalls 20,21 of the top cushions 17 can also be flat, concave, or convex intermediate their circular marginal edges, depending on the cushioning effect desired.

In some instances, it may be desirable to produce the top cushions 17 from a different resilient elastomeric material, e.g. a material which has different cushioning characteristics, from that of the bottom cushions 13. However, it is preferable to integrally make the bottom and top cushions 13,17 of the same rubbery material to form a pair of identical, but oppositely disposed composite cushions 22 between which the metal plate 7 is sandwiched.

One or a plurality of similar, frusto-conically shaped dowels 23 and matingly configured recesses 24 for receiving such dowels 23, as best described in U.S. Pat. No. 4,025,063, are provided in the outer curved surfaces 19 of the composite cushion 22 to maintain a plurality of like composite cushion pads 6 in juxtaposed alignment, as best illustrated in U.S. Pat. No. 3,537,696. The dowels 23 and recesses 24 are generally centered between the opposing sidewalls 20,21 of the top cushions 17.

The inner sidewalls 20 of the top cushions 17 are laterally offset outwardly from the adjacent inner sidewalls 15 of the bottom cushions 13, relative to the center axis A—A of the metal plate 7, whereas the outer sidewalls 21 of the top cushions 17 are laterally offset inwardly from the adjacent outer sidewalls 16 of the bottom cushions 13. Thus, the converging sidewalls 20,21 of the top cushions 17 are offset inwardly from the converging sidewalls 15,16 of the bottom cushions 13 in a direction towards each other. The laterally offset inner sidewalls 15,20 and laterally offset outer sidewalls 16,21 of the bottom and the top cushions 13,17, are joined by annular surfaces 25,26 which can be flat, but are preferably curved, being generally concave relative to the metal plate 7. The largest overall width W of the top cushions 17, measured adjacent the top of the bottom cushions 13 and in a radial direction relative to the center axis A—A of the opening 8, is smaller than the correspondingly measured width w of the adjacent outer surfaces 14 of the bottom cushions 13. Thus, it can be appreciated that a step is formed between the laterally offset inner sidewalls 15,20 and the laterally offset outer sidewalls 16,21, so that the composite cushions 22 are each provided with a pair of opposing inner and outer composite sidewalls 27,28 which have a distinct, stepped configuration.

There are many different embodiments of the circular composite cushion pad 6, depending on the angular disposition of the sidewalls 15,16,20,21 of the bottom and top cushions 13,17 in relation to the planar surfaces 11,12, or the plane of the metal plate 7. For example as best seen in FIG. 2, the bottom and top cushions 13,17 can each be symmetrical, in cross-section relative to a center axis midway between the sidewalls, if the angular disposition of the converging sidewalls of each cushion is the same. Conversely, the bottom and top cushions 13,17 can each be asymmetrical, in cross-section relative to a center axis midway between the sidewalls, if the angular disposition of the converging sidewalls of each cushion is different.

The inner and outer sidewalls 15,16 of the bottom cushions 13 are disposed at angles B,C, measured in opposite directions from the plane of the metal plate 7, in the broad range of from 30° to 50°, each of the inner sidewalls 15 being sloped at an angle B which is preferably in the narrower range of from 40° to 50°, and each of the outer sidewalls 16 being sloped at an angle C which is preferably in the narrower range of from 30° to 40°. The inner and outer sidewalls 20,21 of the top cushions 17 are disposed at angles D,E, also measured in opposite directions from the plane of the metal plate 7, in the broad range of from 40° to 60°, each of the inner sidewalls 20 being sloped at an angle D which is preferably in the narrower range of from 50° to 60° and each of the outer sidewalls 21 being sloped at an angle E which is preferably in the narrower range of from 40° to 50°. The angular disposition of the outer sidewalls 21,16 of the top and bottom cushions 17,13 are preferably smaller, e.g. 5° to 10°, than the angular disposition of the inner sidewalls 20,15, so that the major portion, or bulk of the rubbery material of the composite cushions 22, is closer the opening 8 in the metal plate 7, in accordance with the teachings of U.S. Pat. No. 3,086,765. Exemplary of a well designed composite cushion pad 6, is a pad having, (i) bottom cushions 13 with opposing inner and outer sidewalls 15,16 at angles B,C, respectively, of 45° and 35°, and (ii) top cushions 17 with opposing inner and outer sidewalls 20,21 at angles D,E, respectively, of 55° and 45°.

With reference to FIGS. 3–5 and 6–8, there is shown two somewhat similar composite cushion pads 29,30, both of which are suitable for use in off-the-road vehicles, or in draft gears of railroad cars. The composite pads 29,30 each comprise a flat, rigid rectangular plate 31 which is composed of any suitable material, e.g. steel, and has a pair of opposing planar surfaces 32,33.

A first, inner cushion 34 is conventionally bonded to each of the pair of planar surfaces 32,33 and extend therefrom and preferably cover the planar surfaces 32,33 of the metal plate 31. The inner or bottom cushions 34, closest the metal plate 31, are each composed of any suitable resilient elastomeric material such as rubber and have a generally frusto-conical cross-section defined by, (i) an outer surface 35 which is generally parallel to the planar surfaces 32,33 or plane of the metal plate 31, and (ii) a pair of oppositely sloping sidewalls 36,37 which are angularly disposed to the plane of the metal plate 31 and generally converge towards each other in a direction away from the metal plate 31. The sloping sidewalls 36,37 of the bottom cushions 34 can be flat, concave or convex intermediate their opposing marginal edges, depending on the cushioning effect desired.

A plurality of elongated resilient, elastomeric outer cushions 40–43 are superimposed on the outer surface 35 of each of the bottom cushions 34 and extend therefrom in a direction away from the metal plate 31. The superimposed outer or top cushions 40–43, farthest from the metal plate 31, each have a generally frusto-conical cross-section in the cross sectional plane of the bottom cushions 34, which plane is transverse to the longitudinal axis of the elongated top cushions 40–43. The frusto-conical cross-section of each of the top cushions 40–43 is defined by, (i) an outer surface 44 which is at least flat and preferably convexly curved in relation to the plane of the metal plate 31, and (ii) a pair of oppositely sloping sidewalls 45,46 which are angularly disposed to the plane of the metal plate 31 and generally converge towards each other in a direction away from the metal plate 31. The sloping sidewalls 45,46 of each of the top cushions 40–43 can be flat, concave or convex intermediate their opposing marginal edges, depending on the cushioning effect desired.

In some instances, it may be desirable to produce the top cushions 40–43 from a different resilient elastomeric material, e.g. a material that has different cushioning characteristics, from that of the bottom cushions 34. However, it is preferable to integrally make the bottom and top cushions 34,40–43 of the same rubbery material to form a pair of identical, but oppositely disposed composite cushions 47 between which the metal plate 31 is sandwiched. The composite cushions 47 each have an outermost pair of similar, but oppositely stepped sidewalls 48.

One or a plurality of similar, frusto-conically shaped dowels 49 and matingly configured recesses 50 for receiving such dowels, are provided in the outer curved surfaces 44 of the composite cushions 47 to maintain a plurality of like, composite cushion pads 29 or 30 in juxtaposed alignment.

A study and comparison of FIGS. 5 and 8 in conjunction with the following description, reveals how each of the rectangular composite cushion pads 29,30 are formed of a plurality of similar, individual elongated composite cushions 51,52, etc., each of which has a pair of opposing stepped sidewalls and a cross-section similar to those of the annular composite cushions 22 of FIGS. 1 and 2. Symmetry or asymmetry of the top and bottom cushions of each of the individual composite cushions 51,52, etc., is achieved as previously described in relation to the annular composite cushions 22.

With reference to FIG. 5, the individual composite cushions 51,52 are deployed on the metal plate 31 so that the adjacent sidewalls 53,54 of their bottom cushions are completely overlapped, as shown in dotted line, to a point where the intermediate surfaces 55 which connect the laterally offset sidewalls of the composite cushions 51,52, etc., are coincidental or abutting. It can be readily seen from FIGS. 4 and 5, that each of the composite cushions 47, so formed, comprises a series of longitudinally extending top cushions or ribs 40–43 with flat top surfaces or ridges 44 separated by simple, generally smoothly curved U-shaped valleys 56–58 which do not extend into the lower cushions 34. The ribs 40–43 each have similar opposing ends 59 which also have stepped configurations. The degree to which the adjacent sidewalls 53,54, etc. of the bottom cushions are overlapped, is the major difference between the composite cushion pads 29,30 of FIGS. 3–5 and FIGS. 6–8.

With reference to FIG. 8, the same individual composite cushions 51,52, etc., are positioned on the metal plate 31 so that the adjacent sidewalls 53,54 of their bottom cushions are in spaced or abutting relation, or slightly overlapped to form a complex valley 60 between each pair of adjacent top cushions or ribs 40–43. Each of the complex valleys 60 has a pair of opposing stepped sidewalls 61,62. A resilient, rubber fillet 63 with an outer exposed surface 64 that is preferably concave relative to the metal plate 31, is integrally formed with the individual composite cushions 51,52, etc., to partially fill the small V-shaped gap or valley formed between the adjacent sidewalls 53,54, etc., of the individual composite cushions 51,52, etc. Thus, the composite cushion pad 30 of FIGS. 6–8 has a plurality of complex, not simple, valleys 60 which extend into the bottom cushions 34 and which have stepped sidewalls 61,62 that are similar to the outermost pair of stepped sidewalls 48 of the composite cushions 47.

It can be appreciated from a study of FIGS. 2, 5 and 8, that the composite cushion pads 6,29,30 are formed from composite cushions having similarly configured cross-sections. In the case of the rectangular cushion pads, it is simply a matter as to how a plurality of individual composite cushions are joined together along their longitudinal marginal edges to form between adjacent top cushions or ribs, simple or complex valleys depending on the configuration of the opposing sidewalls of the valleys.

It should be understood that, in some instances, a single top cushion can be used in the rectangular composite cushion pads in place of the plurality of top cushions, as shown and described. FIG. 9 illustrates how two such pads can be adapted to form a different type composite pad 65 which is comprised of two, parallel, rigid, rectangular or circular metal plates 66,67, between which is sandwiched a corresponding rectangular or circular shaped twin-size composite cushion 68 that is integrally formed of two individual composite cushions 69,70, each of which comprises a single, top cushion 71 and a bottom cushion 72, as previously described. The outer surfaces of the top cushions 70 are in abutting relation, such that the individual composite cushions 69,70 are oppositely disposed. Further, the individual composite cushions 69,70 are mirror-images of each other, relative to a plane F—F which bisects the twin-sized composite cushion 68. Any suitable means, such as a number of detents 73 and matingly shaped indents 74 for receiving the detents 73, can be provided in the outer surfaces 75,76 of the metal plates 66,67 to properly align a plurality of like composite cushion pads 65 with twin-size composite cushions 68.

Thus, there has been described composite cushion pads which provide different spring rates or cushioning effects by the provision of at least two differently sized resilient elastomeric cushions which are pyramided on opposing sides of a rigid circular or rectangular plate. The cross-sectional area of the top cushion of each composite cushion, is always less than the correspondingly measured cross-sectional area of the bottom cushion. A soft cushioning effect results, when the smaller outer cushions of two like pads contact. This soft cushioning effect is subsequently firmed up as the larger, inner cushions of the pads are brought into play.

What is claimed is:

1. A composite cushion pad used with like cushion pads in juxtaposed abutting relation to resist a load applied thereagainst, comprising:
   (a) a rigid plate having an outer cylindrical periphery in radially spaced relation from a centrally disposed circular opening which extends axially through the plate, at least one annular planar surface being defined between the opening and outer periphery of the plate;
   (b) a first resilient solid elastomeric annular cushion secured to, and substantially covering the surface and extending therefrom, the first cushion surrounding the opening and having curved inner and outer marginal sidewalls in radially spaced relation, the inner marginal sidewall being closer the opening and the outer marginal sidewall being closer the outer periphery, the marginal sidewalls of the first cushion generally converging in a direction away from the plate and being disposed at acute angles, relative to the plate, such that under compression the first cushion will not bulge outwardly of the outer periphery of the plate;
   (c) a second resilient solid elastomeric annular cushion superimposed on the first cushion and integrally formed therewith and extending therefrom in a direction away from the plate, the second cushion having a curved inner marginal sidewall which is laterally offset inwardly from the inner marginal sidewall of the first cushion in a direction away from the opening, and a second outer marginal sidewall which is laterally offset inwardly from the outer marginal sidewall of the first cushion in a direction toward the opening, the marginal sidewalls of the second cushion generally converging towards each other in a direction away from the plate and being disposed at acute angles, relative to the plate, that are greater than correspondingly measured angles of the closest marginal sidewalls of the first cushion to provide a sharp difference between the initial soft cushioning and subsequent stiff cushioning of the pad, the top second cushion having an annular outer surface which is substantially flat and in a plane which is parallel to the planar surface of the plate, and the bottom first cushion having a pair of outer annular surfaces which connect the laterally offset marginal sidewalls of the first and second cushions and which are substantially in the same plane and generally parallel to the plane of the planar surface of the plate.

2. The composite cushion pad of claim 1, wherein the plate includes a second planar surface which is parallel to the other planar surface and to which like first and second cushions are secured as mirror images of the first and second cushions secured in an opposite direction to the other planar surface of the plate.

3. The composite cushion pad of claims 1, or 2 which includes means disposed on each outer surface of the second cushion for maintaining the pad in juxtaposed alignment with another like pad.

* * * * *